United States Patent Office 3,828,040
Patented Aug. 6, 1974

3,828,040
ANTHRAQUINONE REACTIVE DYESTUFFS
Hans-Samuel Bien, Burscheid, Wolfgang Harms, Leverkusen, Reinold Schmitz, Blecher, and Heinrich Leister, Cologne-Stammheim, Germany, assignors to Bayer Aktiengesellschaft, Leverkusen, Germany
No Drawing. Continuation of application Ser. No. 684,931, Nov. 22, 1967. This application July 17, 1970, Ser. No. 64,007
Claims priority, application Germany, Nov. 30, 1966, F 50,802
Int. Cl. C07d $51/36$, $55/48$
U.S. Cl. 260—249                6 Claims

ABSTRACT OF THE DISCLOSURE

Anthraquinone reactive dyestuffs consisting of 1,4,5-triamino anthraquinones wherein the 1 and 4 - amino groups are substituted by sulfoarylene, sulfoaralkylene or sulfatoalkylene radicals and the 5-amino group is substituted by a reactive group. The dyestuffs are especially suitable for use in dyeing hydroxyl or nitrogen containing textile materials, especially natural and regenerated cellulose, wool, silk, synthetic polyamide and polyurethane fibers thereby yielding dyeings of excellent fastness properties.

This application is a continuation of Ser. No. 684,931, dated Nov. 22, 1967, now abandoned.

The invention relates to new anthraquinone reactive dyestuffs of the formula

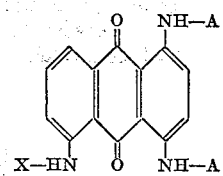

in which the radicals A stand for identical or different sulpho group-containing arylene radicals, sulpho group-containing aralkylene radicals or sulphatoalkylene radicals and X is a reactive group which is linked to the amino group in the 5-position of the anthraquinone nucleus either directly or via a further bridge member.

Examples of arylene radicals containing sulpho groups are: sulphophenyl, sulpho-$o$-, -$m$- or -$p$ - methylphenyl, sulpho-$o$-, -$m$- or $p$-methoxyphenyl, sulpho - $p$-tert.butylphenyl, sulpho-2,4-dimethylphenyl, sulpho-2,6 - dimethylphenyl, sulpho-2,5-dimethylphenyl, sulpho-3,5 - dimethylphenyl, sulpho-2,6-diethyl-4 - methylphenyl and sulpho-$o$-, -$m$- or -$p$-chlorophenyl radicals; suitable sulpho group-containing aralkyl radicals are, for example, the sulpho-$\beta$-phenylethyl, 5-methyl-1 - (sulphophenyl) - hexyl - 3, sulpho-1,2,3,4-tetrahydronaphthyl - (1), sulpho - 1,2,3,4-tetrahydronaphthyl-(2), sulpho-4-benzyl - cyclohexyl-(1) and sulpho-2-benzyl - cyclohexyl- (1) radicals; suitable sulphatoalkyl radicals are, for example, the $\beta$-hydroxyethyl, $\gamma$-hydroxypropyl, $\beta$-hydroxypropyl and $\gamma$-hydroxybutyl radicals esterified with sulphuric acid. It follows from this compilation that the term "aralkylene" in the meaning of the definition according to the invention includes also those radicals in which the alkylene part of the aralkyl radical is of cyclic nature.

If the reactive group X is linked to the amino group in the 5 - position of the anthraquinone nucleus via a bridge member, the following bridge members are suitable, for example: open-chain bridge members, such as lower alkylene groups and

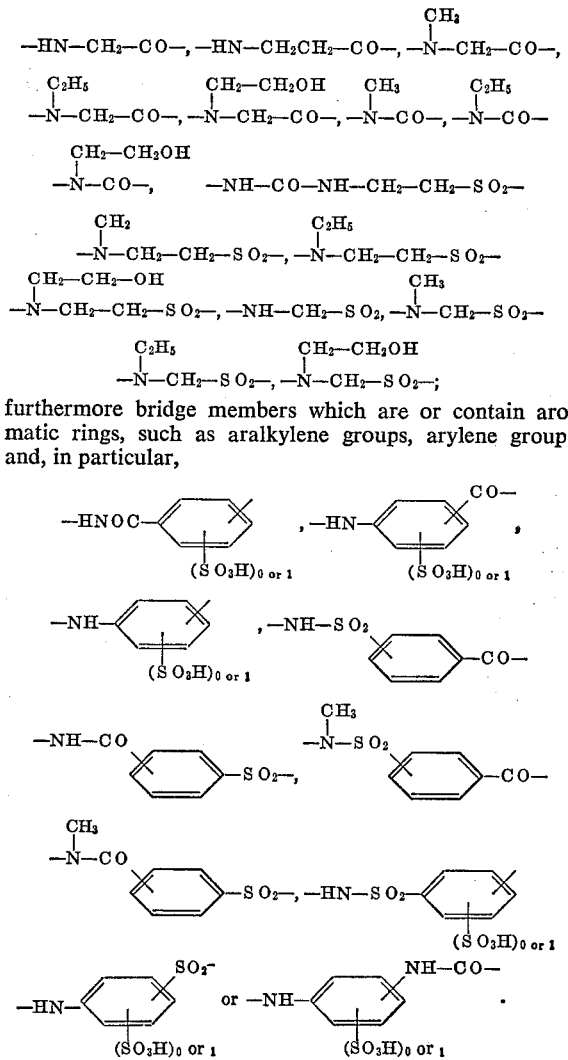

furthermore bridge members which are or contain aromatic rings, such as aralkylene groups, arylene groups and, in particular, Reactive groups X are known to comprise groupings which contain one or more reactive groups or substituents capable of being split off, which are able to react with the hydroxyl groups of cellulose with the formation of covalent bonds when the dyestuffs are applied to cellulose materials in the presence of acid-binding agents. A large number of reactive groups of this kind are known from the literature. The groupings given below are therefore only a selection of possible reactive groups X in the new dyestuffs. Suitable reactive groups are, inter alia, those which contain at least one reactive substituent attached to a 5- or 6-membered heterocyclic ring, such as a monazine, diazine, triazine, e.g. pyridine, pyrimidine, pyridazine, pyrazine, thiazine, oxazine or asym. or sym. triazine ring, or to a ring system which contains one or more fused aromatic rings, such as a quinoline, phthalazine, cinnoline, quinazoline, quinoxaline, acridine, phenazine and phenanthridine ring system; the 5- or 6-membered heterocyclic rings which contain at least one reactive substituent are therefore preferably those which contain one or more nitrogen atoms and may contain fused 5-membered or, preferably, 6-membered carbocyclic rings. Examples of reactive substituents on the heterocycle are halogen (Cl, Br or F), ammonium, including hydrazinium, sulphonium, sulphonyl, azido-(N$_3$), thiocyanato, thio, thioether, hydroxyether, sulphinic acid and sulphonic acid. As individual examples there may be mentioned mono- or dihalo-*sym.*-triazinyl radicals, e.g. 2,4-dichlorotriazinyl-6-; 2-amino-4-chlorotriazinyl-6-; 2 - alkylamino-4-chlorotriazinyl-6-, such as 2-methylamino-4-chlorotriazinyl-6-, 2-ethylamino- or 2-propylamino-4-chlorotriazinyl-6-, 2-β-hydroxyethylamino-4-chlorotriazinyl-6-, 2-di-β-hydroxyethylamino-4-chlorotriazinyl-6- and the corresponding sulphuric acid semiesters; 2-diethylamino - 4 - chlorotriazinyl-6-; 2-morpholino- or 2-piperidino-4-chlorotriazinyl-6-; 2-cyclohexylamino-4-chlorotriazinyl-6-; 2-arylamino- and subst. arylamino-4-chlorotriazinyl-6-, such as 2-phenylamino-4-chlorotriazinyl-6-, 2-(*o*-, *m*- or *p*-sulphophenyl)-amino-4-chlorotriazinyl-6-; 2-alkoxy-4-chlorotriazinyl-6-, such as 2-methoxy- or -ethoxy-4-chlorotriazinyl-6-, 2-(phenylsulphonylmethoxy) - 4 - chlorotriazinyl-6-; 2-aryloxy- and subst. aryloxy-4-chlorotriazinyl-6-, such as 2-phenoxy-4-chlorotriazinyl-6-, 2-(*p* - sulphophenyl)-oxy-4-chlorotriazinyl-6-, 2-(*o*-, *m*- or *p*-methyl- or methoxyphenyl)-oxy-4-chlorotriazinyl-6; 2-alkylmercapto- or 2-arylmercapto- or 2-(subst. aryl)-mercapto-4-chlorotriazinyl-6-, such as 2-(β-hydroxyethyl)-mercapto-4-chlorotriazinyl-6-, 2-phenylmercapto - 4 - chlorotriazinyl-6-, 2-(4'-methylphenyl)-mercapto-4-chlorotriazinyl-6-, 2-(2',4'-dinitro)-phenylmercapto-4-chlorotriazinyl-6-; mono-, di- or trihalopyrimidyl radicals, such as 2,4-dichloropyrimidyl-6-, 2,4,5-trichloropyrimidyl-6-, 2,4-dichloro-5-nitro- or -5-methyl- or -5-carboxymethyl- or -5-carboxy- or -5-cyano- or -5-vinyl- or 5-sulpho- or -5-mono-, -di- or -trichloromethyl- or -5-carboalkoxy-pyrimidyl-6-; 2,6-dichloropyrimidine-4-carbonyl-2,4-dichloropyrimidine-5-carbonyl, 2-chloro-4-methylpyrimidine-5-carbonyl-, 2 - methyl-4-chloropyrimidine-5-carbonyl-, 2-methylthio - 4 - fluoropyrimidine-5-carbonyl-, 6-methyl-2,4-dichloropyrimidine-5-carbonyl- 2,4,6-trichloropyrimidine-5-carbonyl-, 2,4 - dichloropyrimidine-5-sulphonyl-; 2-chloroquinoxaline-3-carbonyl-, 2- or 3-monochloroquinoxaline-6-carbonyl-, 2- or 3-monochloroquinoxaline-6-sulphonyl-, 2,3 - dichloroquinoxaline-6-carbonyl-, 2,3 - dichloroquinoxaline-6-sulphonyl-; 1,4-dichlorophthalazine-6-sulphonyl- or -6-carbonyl-: 2,4-dichloroquinazoline-7- or -6-sulphonyl- or -carbonyl-; 2- or 3- or 4-(4',5'-dichloropyridazone-6'-yl-1') - phenyl sulphonyl- or -carbonyl-; β-(4',5'-dichloropyridazone-6'-yl-1')-ethylcarbonyl-; N-methyl-N-(2,4-dichlorotriazinyl 6)-carbamyl-, N - methyl-N-(2-methylamino-4-chlorotriazinyl-6)-carbamyl-, N-methyl - N - (2-dimethylamino-4-chlorotriazinyl-6)-carbamyl-; N-methyl- or N-ethyl-N-(2,4-dichlorotriazinyl-6)-aminoacetyl-, N - methyl-N-(2,3-dichloroquinoxaline-6-sulphonyl)-aminoacetyl-, N - methyl-N-(2,3-dichloroquinoxaline-6-carbonyl) - aminoacetyl- as well as the corresponding bromine and fluorine derivatives of the above chloro-substitued heterocyclic radicals; sulphonyl group-containing triazine radicals, such as 2,4-bis-(phenylsulphonyl)-triazinyl-6-, 2-(3'-carboxyphenyl)-sulphonyl)-4-chlorotriazinyl-6-, 2-(3'-sulphophenyl)-sulphonyl-4-chlorotriazinyl-6-, 2,4-bis-(3'-carboxyphenylsulphonyl-1')-triazinyl-6-; sulphonyl group-containing pyrimidine rings, such as 2-carboxymethylsulphonyl-pyrimidinyl-4,
2-methylsulphonyl-6-methyl-pyrimidinyl-4,
2-methyl-sulphonyl-6-ethyl-pyrimidinyl-4,
2-phenylsulphonyl-5-chloro-6-methyl-pyrimidinyl-4,
2,6-bis-methylsulphonyl-pyrimidinyl-4,
2,6-bis-methylsulphonyl-5-chloro-pyrimidinyl-4,
2,4-bis-methylsulphonyl-pyrimidine-5-sulphonyl,
2-methylsulphonyl-pyrimidinyl-4,
2-phenyl-sulphonyl-pyrimidinyl-4,
2-trichloromethylsulphonyl-6-methyl-pyrimidinyl-4,
2-methylsulphonyl-5-chloro-6-methyl-pyrimidinyl-4,
2-methylsulphonyl-5-bromo-6-methyl-pyrimidinyl-4,
2-methylsulphonyl-5-chloro-6-ethyl-pyrimidinyl-4,
2-methylsulphonyl-5-chloro-6-chloromethyl-pyrimidinyl-4,
2-methylsulphonyl-4-chloro-6-methylpyrimidine-5-sulphonyl,
2-methylsulphonyl-5-nitro-6-methyl-pyrimidinyl-4,
2,5,6-tris-methylsulphonyl-pyrimidinyl-4,
2-methylsulphonyl-5,6-dimethyl-pyrimidinyl-4,
2-ethylsulphonyl-5-chloro-6-methyl-pyrimidinyl-4,
2-methylsulphonyl-6-chloro-pyrimidinyl-4,
2,6-bis-methylsulphonyl-5-chloro-pyrimidinyl-4,
2-methylsulphonyl-6-carboxy-pyrimidinyl-4,
2-methylsulphonyl-5-sulpho-pyrimidinyl-4,
2-methylsulphonyl-6-carbomethoxy-pyrimidinyl-4,
2-methylsulphonyl-5-carboxypyrimidinyl-4,
2-methylsulphonyl-5-cyano-6-methoxy-pyrimidinyl-4,
2-methylsulphonyl-5-chloro-pyrimidinyl-4,
2-sulphoethylsulphonyl-6-methyl-pyrimidinyl-4,
2-methylsulphonyl-5-bromo-pyrimidinyl-4,
2-phenylsulphonyl-5-chloro-pyrimidinyl-4,
2-carboxymethylsulphonyl-5-chloro-6-methylpyrimidinyl-4,
2-methylsulphonyl-6-chloropyrimidine-4- and -5-carbonyl-,
2,6-bis-(methylsulphonyl)-pyrimidinyl-4- or -5-carbonyl-,
2-ethylsulphonyl-6-chloropyrimidine-5-carbonyl-,
2,4-bis-(methylsulphonyl)-pyrimidine-5-sulphonyl,
2-methylsulphonyl-4-chloro-6-methylpyrimidine-5-sulphonyl- or -carbonyl;

ammonium group-containing triazine rings, such as 2-trimethylammonium-4-phenylamino- or -4-(*o*-, *m*- or *p*-sulphophenyl)-aminotriazinyl-6-, 2-(N,N - dimethylhydrazinium)-4-phenylamino- or -4-(*o*-, *m*- or *p*-sulphophenyl)-aminotriazinyl-6-, 2-(N' - isopropylidene-N,N-dimethyl)-hydrazinium-4-phenyl-amino- or -4-(*o*-, *m*- or *p*-sulphophenyl) - aminotriazinyl-6, 2-N-amino-pyrrolidinium- or 2-N-aminopiperidinium-4-phenyl-amino- or -4-(*o*-, *m*- or *p*-sulphophenyl)aminotriazinyl-6-; furthermore, 4-phenylamino- or 4-(sulphophenylamino) - triazinyl-6 radicals which contain 1,4-bis-aza-bicyclo-[2,2,2]octane or 1,2-bis-aza-bicyclo[0,3.3]-octane in the 2-position in quaternary linkage via a nitrogen bond; 2-pyridinium-4-phenylamino- or -4-(*o*-, *m*- or *p*-sulphophenyl)-amino-triazinyl-6- and the corresponding 2-oniumtriazinyl-6- radicals substituted in the 4-position by alkylamino groups such as methylamino, ethylamino or β-hydroxyethylamino groups, or by alkoxy groups, such as methoxy- or ethoxy- groups or by aroxy groups, such as phenoxy- or sulphophenoxy groups; 2-chlorobenzothiazole-5- or -6-carbonyl- or -5- or -6-sulphonyl-; 2-arylsulphonyl- or -alkylsulphonyl-benzothiazole-5- or -6-carbonyl- or -5- or -6-sulphonyl-, such as 2-methylsulphonyl- or 2 - ethylsulphonyl - benzothiazole-5- or -6-sulphonyl- or -carbonyl-, 2-phenylsulphonyl-benzothiazole-5- or -6-sulphonyl- or -carbonyl- and the corresponding 2-sulphonylbenzothiazole-5- or -6-carbonyl- or -sulphonyl derivatives containing sulpho groups in the fused benzene ring; 2-chlorobenzo-oxazole-5- or -6-carbonyl- or -sulphonyl-, 2-chlorobenzimidazole-5- or -6-carbonyl- or -sulphonyl-, 2-chloro-1-methylbenzimidazole-5- or -6-carbonyl- or -sulphonyl-, 2-chloro-4-methylthiazole-(1,3)-5-carbonyl- or -4- or -5-sulphonyl-, N-oxide of 4-chloro- or 4-nitroquinoline-5-carbonyl.

Reactive groups of the aliphatic series should also be mentioned, such as acryloyl-; mono-, di- or trichloroacryloyl, such as —CO—CH=CH—Cl, —CO—CCl=CH$_2$, —CO—CCl=CH—CH$_3$;

and also —CO—CCl=CH—COOH,

—CO—CH=CCl—COOH,

β-chloropropionyl-, 3-phenylsulphonylpropionyl-, 3-methylsulphonylpropionyl-, 3-ethylsulphonylpropionyl-, β-sulphatoethyl-, β-sulphatoethylamino-sulphonyl-, β-sulphatoethyl-sulphonylamino-, N-β-sulphatoethyl-sulphonyl-N-alkyl (such as -methyl and -ethyl)-amino-, vinylsulphonyl-, β - chloroethylsulphonyl-, β - sulphatoethylsulphonyl-, β-methylsulphonyl - ethylsulphonyl-, β - phenylsulphonylethylsulphonyl-, 3-sulphatopropionyl-, 2,2,3,3-tetrafluorocyclobutane-carbonyl-1- or -sulphonyl-1- and β-(2,2,3,3-tetrafluorocyclobutyl-1)-acryloyl groups.

An especially preferred class of anthraquinone reactive dyestuffs which can be obtained according to the invention correspond to the formula

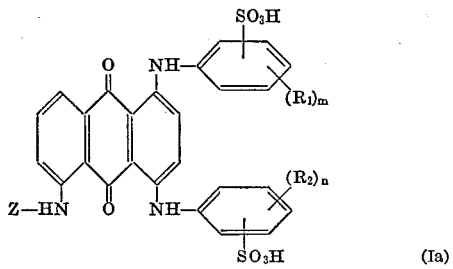

in which $R_1$ denotes hydrogen, Cl, Br, lower alkyl or lower alkoxy, $m$ is the number 1 or 2, $R_2$ is hydrogen, Cl, Br, lower alkyl or lower alkoxy, $n$ is the number 1 or 2, and Z is a triazine, pyrimidine, pyrimidinocarbonyl, quinoxalinocarbonyl and -sulphonyl, phthalazinocarbonyl, benzothiazole-carbonyl and -sulphonyl, pyridazone-alkylene-carbonyl or -sulphonyl ring, the ring member Z containing at least one reactive substituent attached to a carbon atom of the heterocycle, or Z stands for a 2,2,3,3-tetrafluorocyclobutyl-1-carbonyl, $\beta$-(2',2',3',3'tetrafluorocyclobutyl-1')-acryloyl, $\alpha,\beta$-dibromopropionyl or $\alpha$-bromoacryloyl group; Z being linked to the NH grouping directly or via an aminophenyl-carbonyl, aminophenylsulphonyl or N-methylamino-acetyl group. Preferred reactive substituents attached to the carbon atoms of the heterocycle are, for example, halogen, such as chlorine or bromine; sulphonyl radicals, such as alkylsulphonyl, aralkylsulphonyl, arylsulphonyl and heterosulphonyl radicals; ammonium groups, including hydrazinium groups; hydroxyether, thioether, sulphonic acid and sulphinic acid substituents.

The new dyestuffs are obtained by converting in aminoanthraquinone compounds of the formula

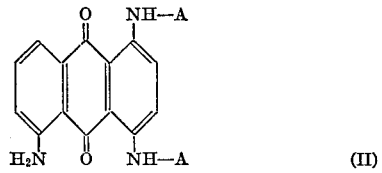

the $NH_2$ group in the 5-position by conventional methods into a grouping —NHX in which X has the same meaning as above. The conversion of the amino group in the 5-position into a grouping —NHX is carried out, for example, by condensing the aminoanthraquinone compound of the formula (II) with a suitable reactive component of the formula

$$X—Y \quad (III)$$

in which X denotes a reactive group and Y is a substituent which can be split off, such as a halogen substituent F, Cl or Br.

Reactive components of the formula (III) suitable for this purpose are, for example, those on which the aforesaid reactive groups X are based, i.e., in general, the halides, especially the chlorides, of the said acyl components X. Of the large number of available compounds the following may be mentioned by way of example: trihalo-sym.-triazines, such as cyanuricchloride and cyanuricbromide, dihalo-monoamino- and -mono-subst.-aminosym.-triazines, such as 2,6-dichloro-4-aminotriazine, 2,6-dichloro-4 - methylaminotriazine, 2,6-dichloro-4-ethylaminotriazine, 2,6-dichloro-4-hydroxyethylaminotriazine, 2,6-dichloro-4-phenylaminotriazine, 2,6-dichloro-4-(o-, m- or p-sulphophenyl)-aminotriazine, 2,6-dichloro-4-(2',3'-, -2',4'-, -3',4'- or -3',5'-disulphophenyl)-aminotriazine; dihalo-alkoxy and -aryloxy-sym.-triazines, such as 2,6-dichloro-4-methoxytriazine, 2,6-dichloro - 4-ethoxytriazine, 2,6 - dichloro - 4 - phenoxytriazine, 2,6-dichloro-4-(o-, m- or p-sulphophenyl) - oxytriazine; dihalo-alkylmercapto- and -arylmercapto-sym.-triazines, such as 2,6-dichloro-4-ethylmercaptotriazine, 2,6-dichloro - 4-phenylmercaptotriazine, 2,6-dichloro-4-(p-methylphenyl) - mercaptotriazine; tetrahalo-pyrimidines, such as tetrachloro-, tetrabromo- or tetrafluoro-pyrimidine; 2,4,6-trihalopyrimidines, such as 2,4,6-trichloro-, -tribromo- or -trifluoropyrimidine; dihalo-pyrimidines, such as 2,4-dichloro-, -dibromo- or -difluoro-pyrimidine, 2,4,6-trichloro-5-nitro- or -5-methyl- or -5-carbomethoxy- or -5-carboethoxy- or -5-carboxymethyl- or -5-mono-, -di- or -trichloromethyl- or -5-carboxy- or -5-sulpho- or -5-cyano- or -5-vinyl-pyrimidine; 2,4-dichloropyrimidine-5-carboxylic acid chloride, 2,4,6-trichloropyrimidine-5-carboxylic acid chloride, 2-methyl-4-chloropyrimidine-5-carboxylic acid chloride, 2-chloro-4-methylpyrimidine-5-carboxylic acid chloride, 2,6-dichloro-4-methylpyrimidine-4-carboxylic acid chloride; pyrimidine reactive components with sulphonyl groups capable of being split off, such as 2-carboxymethylsulphonyl-4-chloropyrimidine,
2-methylsulphonyl-4-chloro-6-methylpyrimidine,
2,4-bis-methylsulphonyl-6-methylpyrimidine,
2,4-bis-phenylsulphonyl-5-chloro-6-methylpyrimidine,
2,4,6-tris-methylsulphonyl-pyrimidine,
2,6-bis-methylsulphonyl-4,5-dichloropyrimidine,
2,4-bis-methylsulphonyl-pyrimidine-5-sulphonic acid chloride,
2-methylsulphonyl-4-chloropyrimidine,
2-phenylsulphonyl-4-chloropyrimidine,
2,4-bis-trichloromethylsulphonyl-6-methylpyrimidine,
2,4-bis-methylsulphonyl-5-chloro-6-methylpyrimidine,
2,4-bis-methylsulphonyl-5-bromo-6-methylpyrimidine,
2-methylsulphonyl-4,5-dichloro-6-methylpyrimidine,
2-methylsulphonyl-4,5-dichloro-6-chloromethyl-pyrimidine,
2-methylsulphonyl-4-chloro-6-methylpyrimidine-5-sulphonic acid chloride,
2-methylsulphonyl-4-chloro-5-nitro-6-methylpyrimidine,
2,4,5,6-tetra-methylsulphonyl-pyrimidine,
2-methylsulphonyl-4-chloro-5,6-dimethylpyrimidine,
2-ethylsulphonyl-4,5-dichloro-6-methylpyrimidine,
2-methylsulphonyl-4,6-dichloropyrimidine,
2,4,6-tris-methylsulphonyl-5-chloropyrimidine,
2-methylsulphonyl-4-chloro-6-carboxypyrimidine,
2-methylsulphonyl-4-chloropyrimidine-5-sulphonic acid,
2-methylsulphonyl-4-chloro-6-carbomethoxypyrimidine,
2-methylsulphonyl-4-chloropyrimidine-5-carboxylic acid,
2-methylsulphonyl-4-chloro-5-cyano-6-methoxypyrimidine,
2-methylsulphonyl-4,5-dichloropyrimidine,
4,6-bis-methylsulphonyl-pyrimidine,
4-methylsulphonyl-6-chloropyrimidine,
2-sulphoethylsulphonyl-4-chloro-6-methylpyrimidine,
2-methylsulphonyl-4-chloro-5-bromopyrimidine,
2-methylsulphonyl-4-chloro-5-bromo-6-methylpyrimidine,
2,4-bis-methylsulphonyl-5-chloropyrimidine,
2-phenylsulphonyl-4,5-dichloropyrimidine,
2-phenylsulphonyl-4,5-dichloro-6-methylpyrimidine,
2-carboxymethylsulphonyl-4,5-dichloro-6-methylpyrimidine,
2-methylsulphonyl-6-chloropyrimidine-4- or -5-carboxylic acid chloride,
2-ethylsulphonyl-6-chloropyrimidine-4- or -5-carboxylic acid chloride,
2,6-bis-(methylsulphonyl)-pyrimidine-4-carboxylic acid chloride,
2-methylsulphonyl-6-methyl-4-chloro- or -4-bromo-pyrimidine-5-carboxylic acid chloride or -bromide,
2,6-bis-(methylsulphonyl)-4-chloropyrimidine-5-carboxylic acid chloride;

further reactive components of the heterocyclic series with reactive sulphonyl substituents are, for example, 3,6-bis-phenylsulphonylpyridazine,
3-methylsulphonyl-6-chloropyridazine, 3,6-bis-trichloromethylsulphonylpyridazine,
3,6-bis-methylsulphonyl-4-methylpyridazine,
2,5,6-tris-methylsulphonylpyrazine,
2,4-bis-methylsulphonyl-1,3,5-triazine,
2,4-bis-methylsulphonyl-6-(3'-sulphophenylamino)-1,3,5-triazine,
2,4-bis-methylsulphonyl-6-N-methylanilino-1,3,5-triazine,
2,4-bis-methylsulphonyl-6-phenoxy-1,3,5-triazine,
2,4-bis-methylsulphonyl-6-trichloroethoxy-1,3,5-triazine,
2,4,6-tris-phenylsulphonyl-1,3,5-triazine,
2,4-bis-methylsulphonylquinazoline,
2,4-bis-trichloromethylsulphonyl-quinoline,
2,4-bis-carboxymethylsulphonyl-quinoline,
2,6-bis-(methylsulphonyl)-pyridine-4-carboxylic acid chloride and
1-(4'-chlorocarbonylphenyl- or 2'-chlorocarbonylethyl)-4,5-bis-methylsulphonyl-pyridazone-(6);

further heterocyclic reactive components with labile halogen are, *inter alia*, 2- or 3-monochloroquinoxaline-6-carboxylic acid chloride or -6-sulphonic acid chloride, 2- or 3-monobromoquinoxaline-6-carboxylic acid bromide or -6-sulphonic acid bromide, 2,3-dichloroquinoxaline-6-carboxylic acid chloride or -6-sulphonic acid chloride, 2,3-dibromoquinoxaline-6-carboxylic acid bromide or -6-sulphonic acid bromide, 1,4-dichlorophthalazine-6-carboxylic acid chloride or -6-sulphonic acid chloride and the corresponding bromine compounds, 2,4-dichloroquinazoline-6- or -7-carboxylic acid chloride or -sulphonic acid chloride and the corresponding bromine compounds, 2- or 3- or 4-(4', 5'-dichloropyridazone 6'-yl-1')-phenylsulphonic acid chloride or -carboxylic acid chloride and the corresponding bromine compounds, β-(4',5'-dichloropyridazone-6'-yl-1')-ethylcarboxylic acid chloride, 2-chloroquinoxaline-3-carboxylic acid chloride and the corresponding bromine compound, N-methyl-N-(2,4-dichlorotriazinyl-6)-carbamic acid chloride, N-methyl-N-(2-chloro-4-methylamino-triazinyl-6)-carbamic acid chloride, N-methyl-N-(2-chloro-4-dimethylaminotriazinyl-6)-carbamic acid chloride, N-methyl- or N-ethyl-N-(2,4-dichlorotriazinyl-6)-aminoacetyl chloride, N-methyl-, N-ethyl- or N-hydroxyethyl-N-(2,3-dichloroquinoxaline-6-sulphonyl- or -6-carbonyl)-aminoacetyl chloride and the corresponding bromine derivatives; further 2-chlorobenzothiazole-5- or -6-carboxylic acid chloride or -5- or -6-sulphonic acid chloride and the corresponding bromine compounds; 2-arylsulphonyl- or 2-alkylsulphonyl-benzothiazole-5- or -6-carboxylic acid chloride or -5- or -6-sulphonic acid chloride, such as 2-methylsulphonyl- or 2-ethylsulphonyl- or 2-phenylsulphonyl-benzothiazole-5- or -6-sulphonic acid chloride or -5- or -6-carboxylic acid chloride and the corresponding 2-sulphonyl-benzothiazole derivatives containing sulphonic acid groups in the fused benzene ring; 2-chlorobenzoxazole-5- or -6-carboxylic acid chloride or -sulphonic acid chloride and the corresponding bromine derivatives; 2-chlorobenzimidazole-5- or -6-carboxylic acid chloride or -sulphonic acid chloride and the corresponding bromine derivatives; 2-chloro-1-methylbenzimidazole-5- or -6-carboxylic acid chloride or -sulphonic acid chloride and the corresponding bromine derivatives; 2-chloro-4-methylthiazole-(1,3)-5-carboxylic acid chloride or -4- or -5-sulphonic acid chloride, 2-chlorothiazole-4- or -5-sulphonic acid chloride and the corresponding bromine derivatives.

The following examples may be mentioned from the series of aliphatic and araliphatic reactive components: 1-chloromethylbenzene-4-sulphonic acid chloride, acrylic acid chloride, mono-, di- or trichloroacrylic acid chloride, 3-chloropropionic acid chloride, 3-phenylsulphonylpropionic acid chloride, 3-methylsulphonyl-propionic acid chloride, 3-ethylsulphonyl-propionic acid chloride, 3-chloroethanesulphochloride, chloromethanesulphochloride, 2 - chloroacetyl chloride, 2,2,3,3 - tetrafluoro - cyclobutane-1-carboxylic acid chloride, β-(2,2,3,3-tetrafluorocyclobutyl-1)-acrylic acid chloride.

For carrying out the condensation reaction, the anthraquinone component (II) is dissolved, for example, in an aqueous or aqueous-organic medium and the pH value of the reaction mixture is adjusted to the value required for the subsequent reaction with the compound (III). In detail, the procedure may consist in that the reactive component (III) is added in powdered form or in the form of an aqueous suspension to a solution of the anthraquinone component (II) or, inversely, the solution of the anthraquinone component (II) is added to an aqueous suspension of the compound (III) and, if necessary, a water-immiscible organic solvent, such as benzene or chlorobenzene, is added. The component (III) can also be dissolved in inert organic solvents, such as acetone, dioxane or benzene, and then added dropwise. The pH value which is most advantageous for the condensation is maintained by the addition of alkaline agents, such as a sodium hydroxide, potassium hydroxide, sodium carbonate or sodium bicarbonate solution. An advantageous pH range is generally comprised between pH 4 and 7. The temperature which is most advantageous for the reaction is generally comprised between 0 and 85° C., depending upon the type of the component (III). The termination of the reaction can easily be recognised by the subsiding consumption of alkaline agent and by observing the progress of the reaction by paper- or thin layer-chromatography. When the condensation reaction is completed, the product is filtered off from any impurities present, the dyestuff is separated from the reaction solution at a pH of, for example, 6 to 7 by salting out, and isolated in the usual manner.

The anthraquinone compounds of the formula (II) required for this reaction can be obtained, for example, by condensing 1,4-dihydroxy-5-amino-anthraquinone or its leuco compound with aromatic, araliphatic or hydroxyaliphatic amines and subsequently sulphonating the aryl radicals or esterifying the hydroxy group of the aliphatic radical with oleum or chlorosulphonic acid for conversion into sulphato groups. It is also possible to condense 1,4-dihydroxy-5-acylamino-anthraquinones with amines of the said type and to hydrolyse the acyl radical of the acylamino group in the 1-position, which can be, for example, an acetyl, benzoyl, nitrobenzoyl, nitrophenylsulphonyl or any other acyl radical, with oleum or chlorosulphonic acid before or after the treatment of the resultant dye bases.

If it is desired to synthetise new dyestuffs of the formula (I) in which the reactive groups X is linked with the amino group in the 5-position of the anthraquinone molecule via a further bridge member which is not a constituent of the reactive group X, it is expedient to use for this purpose aminoanthraquinone dyestuffs of the formula

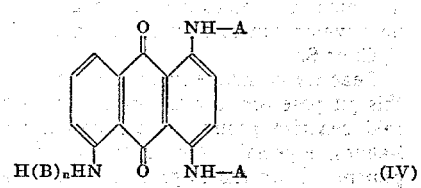

in which the radicals A represent identical or different radicals of the specified type, B stands for a bridge member and n is the number 1 [the use of amino-anthraquinone compounds of the formula (IV) in which n=0 is identical with the use of amino-anthraquinone compounds of the formula (II)]. The active hydrogen atom in the bridge member B, which is necessary for the reaction with reactive components of the formula (III) is preferably a hydrogen of an amino group in the bridge member B, which is capable of condensation. Suitable groupings H—B—NH in the 5-position of compounds of the formula (IV) are, for example,

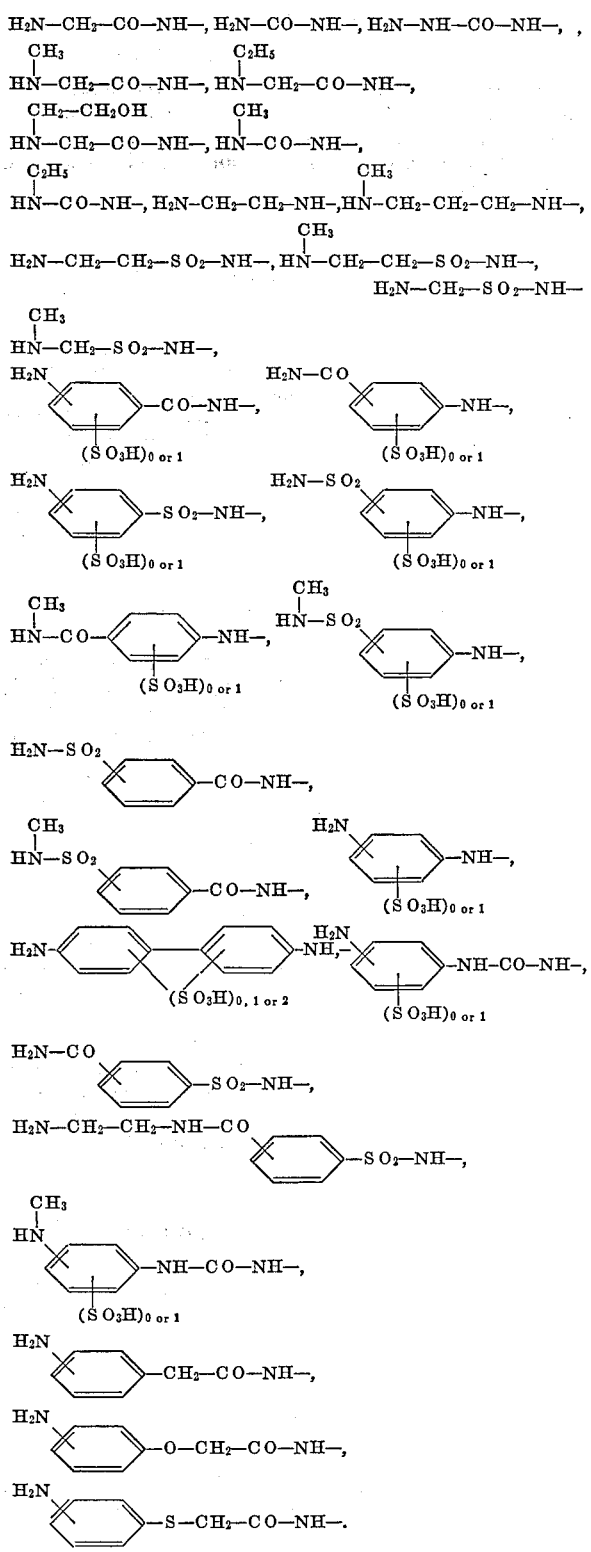

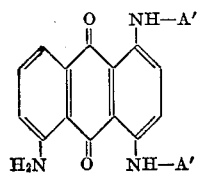

A modification of the process for the production of the new dyestuffs according to the invention consists in that amino-anthraquinone compounds of the formula (V)

in which the radicals A' denote identical or different aryl, aralkyl or hydroxyalkyl radicals, the amino group in the 5-position is converted into a grouping —NH—X in which X has the same meaning as above, and the dyestuffs so obtained are subsequently treated with sulphonating or sulphating agents, such as oleum or chlorosulphonic acid, with sulphonation or sulphation of the radicals A'. According to this variant of the process, the sulphonic acid groups or, in the case of an alkyl radical, the sulphato groups present in the radicals A of the new dyestuffs of the formula (I) are introduced in the last stage of the dyestuff production instead of being present already in the starting components such as those of the formula (II).

If the products which can be obtained according to the invention contain in the radical of the reactive component X more than one substituent capable of being split off, for example, in the case of reaction produces with cyanuric chloride, two labile chlorine substituents in the dyestuffs containing a dichloro-triazinyl-amino group, then one of these labile substituents can subsequently be exchanged for the radical of a hydroxy, thio or, preferably, amino group. For this purpose it is possible, for example, to condense reaction products of amino-anthraquinone compounds of the formula (II) or anthraquinone compounds of the formula (IV) with cyanuric chloride, cyanuric bromide, trismethyl-sulphonyl-sym.-triazine or trisphenyl-sulphonyl-sym.-triazine or tetrahalopyrimidine or 2,4,6-trihalo-pyrimidine or other suitable, at least trifunctional reactive components, and to react the product in a further process step with hydroxy compounds, such as aliphatic alcohols, e.g. methanol or ethanol; phenols, such as phenol and p-chlorophenol; or, preferably, with ammonia or amines, such as methylamine, dimethylamine, ethylamine, hydroxyethylamine, dihydroxyethylamine, morpholine, piperidine, asym.dimethylhydrazine, hydrazine and differently substituted hydrazines, pyridine, phenylamine or substituted phenylamines, such as o-, m- or p-sulphophenylamines, tolylamines etc., whereby at least one exchangeable substituent in the reactive component X is obtained.

The new dyestuffs are extremely valuable products which are suitable for a great variety of purposes. As water-soluble compounds they are primarily of interest for the dyeing of hydroxyl group-containing and nitrogen-containing textile materials, especially of textile materials of natural and regenerated cellulose, and also of wool, silk, synthetic polyamide and polyurethane fibres. Due to the reactive group X, the products are particularly well suited as reactive dyestuffs for the dyeing of cellulose materials by the methods which have recently become known for this purpose. The fastness properties obtained, especially the fastness to wet processing, are excellent.

For dyeing cellulose, the dyestuffs are preferably used in an aqueous solution to which there may be added compounds of alkaline reaction, such as alkali metal hydroxide or alkali metal carbonate, or compounds which are convertible into substances of alkaline reaction, such as alkali metal bicarbonate. Other auxiliaries may be added to the solution, but these should not react with the dyestuffs in an undesirable manner. Additives of this kind are, for example, surface-active compounds, such as alkylsulphates; or substances preventing the migration of the dyestuffs; or dyeing auxiliaries, such as urea (to improve the solubility and the fixation of the dyestuffs), or inert thickening agents, such as oil-in-water emulsions, tragacanth, starch, alginate or methyl cellulose.

The solutions or pastes thus prepared are applied to the material to be dyed, for example, by padding on a foulard (short bath) or by printing, and the material is subsequently heated for some time at an elevated temperature, preferably 40 to 150° C. Heating can be carried out in a hot flue, in a steaming apparatus, on heated rollers or by introducing the material into heated salt baths, either alone or successively in any sequence.

When a padding or dyeing liquor without alkali is used, the dry material is subsequently passed through a solution of alkaline reaction, to which common salt or Glauber's salt has been added. The addition of salt prevents the migration of the dyestuff from the fibre.

It is also possible to pre-treat the material to be dyed with one of the acid-binding agents mentioned above, subsequently to treat it with the solution or paste of the dyestuff and, finally, to carry out fixation at an elevated temperature, as stated.

For dyeing from a long bath, the material is introduced, for example, into an aqueous solution of the dyestuff (liquor ratio 1:5 to 1:40) at room temperature and dyeing is performed for about 40 to 90 minutes, possibly while increasing the temperature to up to 85° C., with the portionwise addition of salt, for example, sodium sulphate, and subsequently of alkali, for example, sodium phosphates, sodium carbonate, NaOH or KOH. The chemical reaction between the dyestuff and the fibre takes place during this operation. After chemical fixation, the dyed material is rinsed hot and subsequently soaped, whereby unfixed residues of the dyestuff are removed. Dyeings of excellent fastness properties, especially fastness to wet processing and light, are obtained.

In the so-called cold batch padding process the subsequent heating of the padded fabric can be saved, for example, by storing the fabric for some time, e.g. 20 to 40 hours, at room temperature. A stronger alkali is used in this process than in the dyeing process from a long bath described above.

For printing materials containing hydroxyl groups, there is used a printing paste prepared from the dyestuff solution, a thickening agent, such as sodium alginate, and a compound of alkaline reaction or splitting off alkali upon heating, such as sodium carbonate, sodium phosphate, potassium carbonate, potassium acetate or sodium or potassium bicarbonate, and the printed material is rinsed and soaped.

Textile materials containing amide groups, such as wool, silk, synthetic polyamide and polyurethane fibres, are generally dyed by the dyeing methods customary for this purpose in the acidic to neutral range, a final increase of the pH value of the dyebath, for example, to pH 6.5 to pH 8.5, being sometimes of advantage.

The dyestuffs are applied, for example, to synthetic polyamide fabrics as solutions or, preferably, in dispersed form and subsequently after-treated, optionally together with acid-binding agents, such as sodium carbonate (preferably smaller amounts). Particularly advantageous results are achieved with dyestuffs which are insoluble or only sparingly soluble in water. These are worked up by conventional methods and with the addition of the known auxiliaries into a dyestuff dispersion and applied as such in the dye and/or padding liquor or in a printing paste. Auxiliaries suitable for this application are, inter alia, compounds preventing the migration of the dyestuff on the fibre, such as cellulose ethers, alkali metal chlorides and sulphates; wetting agents, such as condensation products from ethylene oxide and fatty alcohols or phenols, sulphonated fatty alcohols; solvents, such as thiodiglycol; thickening agents, such as starch, tragacanth, alginate thickener, gum arabic etc.

The after-treatment of the dyeings, impregnations and prints obtained on fabrics of polyamide fibres is preferably carried out at a temperature of 50 to 110° C. for a period of time ranging from 5 to 60 minutes.

The dyeings which can be obtained with the new dyestuffs are generally characterised by good to very good fastness properties, especially by excellent fastness to wet processing.

In the following examples the parts are parts by weight, unless otherwise stated. The temperatures are given in degrees centigrade.

EXAMPLE 1

8.5 parts of the sodium salt of 1,4-di-(4'-methylphenylamino)-5-amino-anthraquinone-2',2''-disulphonic acid are dissolved in 150 parts of water. 7 parts 2,4,5,6-tetrachloropyrimidine are added to the solution which is heated at 80 to 85° with reflux cooling for 16 hours. The acid liberated by the reaction is neutralised by the dropwise addition of a 1N sodium hydroxide solution so that a pH value of 5.5 to 7 is maintained in the reaction mixture.

When the reaction is completed, the excess tetrachloropyrimidine is driven off by boiling the solution without reflux cooling. When the dyestuff solution has cooled to 20°, it is filtered and 23 parts sodium chloride are gradually added to the filtrate. The precipitated dyestuff is filtered off with suction, washed with 230 parts of a 10% sodium chloride solution and dried at 50°. It corresponds to the formula

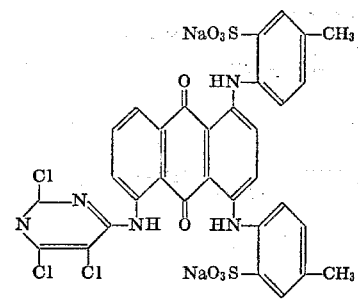

3 parts of this dyestuff are dissolved with 50 parts of water at 20° and 15 parts urea. After the addition of 15 parts of a 10% sodium carbonate solution, the solution is made up to 100 parts by volume. 20 parts of a cotton fabric are padded with this solution on a foulard in such a manner that the liquor absorption of the fabric amounts to 80% of its dry weight. The padded fabric is subjected to an intermediate drying and steamed at 102 to 103° for 8 minutes or thermofixed at 150° for 4 minutes. The dyeing is finished by rinsing, soaping at the boil, rinsing again and drying the fabric. There is obtained a green dyeing of good fastness properties, such as fastness to washing and light.

The 1,4-di-(4'-methylphenylamino)-5-amino-anthraquinone-2',2''-disulphonic acid used in the present Example as starting material can be obtained in the following manner:

15 parts 5-aminoquinizarine, 100 parts p-toluidine, 8 parts boric acid and 8.3 parts of concentrated hyrochloric acid are heated to 75°. 2 parts of zinc dust are introduced within one hour into the melt which is subsequently heated at 90 to 95° for 2½ hours. 15 parts pulverised potassium hydroxide are subsequently introduced into the melt in such a way that the temperature does not exceed 95°. Residues of leuco compounds are oxidised by passing a vigorous air current into the melt. 100 parts methanol are poured into the melt at 65°, whereupon the 1,4-di-(4'-methylphenylamino) - 5 - aminoanthraquinone crystallises in the form of green needles. The product is filtered off with suction at 30°, washed with 200 parts methanol and then with 1000 parts of boiling water.

20 parts of the compound so obtained are introduced at 5 to 10° in the course of 3 hours into 48 parts of 20% oleum and 52 parts of concentrated sulphuric acid. When the dye base is dissolved, a further 34 parts of 20% oleum are added and stirring is continued until no more dye base or monosulphonated dye base can be detected by chromatography. The mixture is subsequently poured on to 300 parts of ice. The aqueous suspension is filtered off with suction and the filter cake is washed with a 15% sodium chloride solution until free from sulphate. The resultant 1,4-di-(4'-methylphenylamino)-5-amino-anthraquinone-2',2''-disulphonic acid is dried at 60° in a circulating air cabinet. It can also be dissolved in hot water with neutralisation and recrystallised by the addition of sodium chloride.

EXAMPLE 2

A solution of 5.5 parts 2,4-dichloro-6-methoxytriazine-1,3,5 in 25 parts acetone is introduced into 200 parts of water. The resultant suspension is heated to 30 to 35° and a solution of 16.3 parts of the sodium salt of 1,4-di-(4'-methylphenylamino) - 5 - amino-anthraquinone-2',2''-disulphonic acid in 300 parts of water is added dropwise in the course of one hour. A pH value of 5.5 to 6.5 is maintained in the reaction mixture by the addition of a 1N sodium carbonate solution. After the dropwise addition of the anthraquinone component, the reaction mixture is kept at 30 to 35° for a further 30 minutes, and the dyestuff solution is then filtered off with suction from residues of the reactive component. The filtrate is mixed at 20 to 25° with 84 parts of solid sodium chloride, the resultant precipitate is filtered off with suction and washed with 200 parts of 13% sodium chloride solution. After drying the filter cake in a vacuum at 20°, a dyestuff of the formula

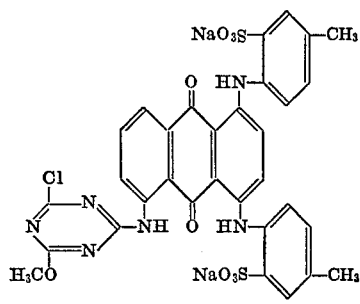

is obtained.

20 parts of cotton fabric are padded on a foulard with a padding liquor containing 3 parts of the dyestuff of the present example, 10 parts urea and 1 part calcinated sodium carbonate per 100 parts of water in such a manner that the liquor absorption of the fabric amounts to 80% of its dry weight. The padded fabric is subjected to an intermediate drying at 80° and then steamed at 102 to 103° for 5 minutes or thermofixed at 125° for 3 mintues. After finishing the dyeing in analogy with the instructions of Example 1, a green dyeing of good fastness properties is obtained.

A similar dyestuff is obtained when the 2,4-dichloro-6-methoxytriazine-1,3,5-is replaced in the present example with 5.4 parts 2,4-dichloro-6-aminotriazine-1,3,5.

EXAMPLE 3

13.3 parts 1,4-di-(4'-methylphenylamino) - 5 - amino-anthraquinone-2',2''-disulphonic acid are dissolved in 350 parts of water, while heating to 50° and adjusting a pH value of 5.5 to 6.5 by the addition of a dilute sodium hydroxide solution. 6.2 parts 2,3-dichloroquinoxaline-6-carboxylic acid chloride and 0.5 parts chlorobenzene are added to the solution at the same temperature and the above pH value is maintained by the addition of a 1N sodium hydroxide solution. The reaction is completed after 1 to 1½ hours. The chlorobenzene is driven off by introducing a vigorous air current. The reaction mixture is diluted with 250 parts of water and the dyestuff solution is filtered off with suction at 50° from small amounts of residues. By salting out with 34 parts sodium chloride at 40 to 45°, filtering off the precipitate with suction and washing the filter cake with 350 parts of a 5% sodium chloride solution, there can be isolated from the filtrate the dyestuff of the formula

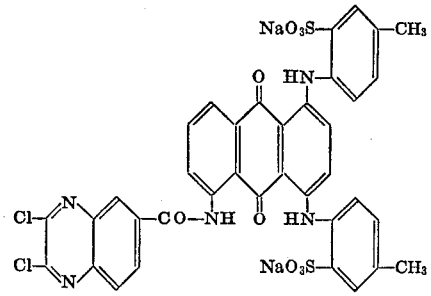

which is dried in a vacuum at 20°.

10 parts cotton yarn are introduced at 30° into a dyebath consisting of 0.3 parts of the dyestuff of the present example in 200 parts of water, the temperature of the dyebath is raised to 50° within 15 minutes, 10 parts of anhydrous sodium sulphate are added, and dyeing is continued for 30 minutes. 4 parts sodium carbonate are then added to the dyebath and dyeing is continued at 50° for a further 60 minutes. The dyed material is rinsed with cold and then with hot water and subsequently soaped at boiling temperature with a solution of 0.2 parts sodium alkylsulphonate in 200 parts of water. After another rinsing and drying, there is obtained a clear green dyeing of very good fastness properties, especially fastness to wet processing and light.

EXAMPLE 4

8.8 parts 1,4-di-(4' - methylphenylamino) - 5 - amino-anthraquinone-2',2''-disulphonic acid are dissolved at 50° in 250 parts of water with simultaneous neutralisation. After 6.7 parts 2,3-dichloroquinoxaline-6-sulphonic acid chloride and 0.5 parts chlorobenzene have been added to the solution, a pH value of 5.5 to 6.5 is maintained in the reaction mixture by the addition of a 1N sodium hydroxide solution. When the reaction is completed after about 2 hours, a vigorous air current is passed through the solution in order to drive off the chlorobenzene. The hot solution is subsequently filtered off with suction from any residues and 31 parts sodium chloride are added to the filtrate after cooling to 20°. The resultant precipitate is filtered off with suction, washed with 250 parts of a 7.5% sodium chloride solution and dried at 20° in a vacuum. The dyestuff of the formula

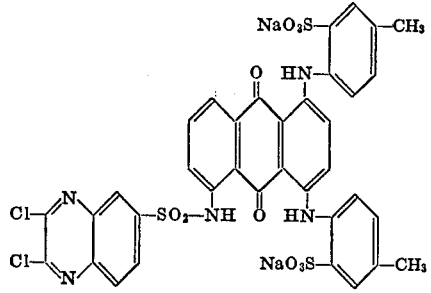

is obtained.

3 parts of the dyestuff of the present example are pasted with 3 parts of water at 20 to 25° and dissolved with 67 parts of water at 20°. To this solution are added 30 parts of a 10% sodium carbonate solution. 20 parts of a fabric of cotton or staple fibre are padded on a foulard with the padding liquor so obtained in such a manner that the liquor absorption of the fabric amounts to 80% of its dry weight. The fabric is rolled up and stored at 25° for 24 hours in such a manner that no moisture can escape. The dyeing is subsequently finished by first thoroughly rinsing with water, then by soaping in a boiling liquor of 0.6 parts sodium alkylsulphonate in 600 parts of water, rinsing again and drying. The dyeing is somewhat more bluish green than that of Example 3.

When the 1,4-di-(4'-methylphenylamino)-5-amino-anthraquinone-2',2"-disulphonic acid is replaced in the preceding examples with other 1,4-diarylamino-5-amino-anthraquinone-disulphonic acids which can be seen from the following table, and these are reacted with 2,3-dichloroquinoxaline-6-carboxylic acid chloride in an analogous manner, then valuable reactive dyestuffs are also obtained which dye cotton in the specified shades:

disulphonic acid in 170 parts of water is poured within 30 minutes into a suspension of cyanuric chloride kept at 0 to 5° and previously prepared by the dropwise addition of a solution of 4 parts 2,4,6-trichlorotriazine-1,3,5 in 20 parts acetone to 100 parts of ice-water. The acid liberated by the reaction of the anthraquinone component with the cyanuric chloride is continuously neutralised by the dropwise addition of a 1N sodium carbonate

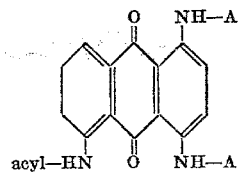

| —A | Acyl | Shade |
|---|---|---|
| —⟨⟩—OCH₃ with SO₃H | 2,3-dichloroquinoxaline-6-carbonyl | Green. |
| Same as above | 2,3-dichloroquinoxaline-6-sulphonyl | Do. |
| —⟨⟩—Cl with SO₃H | 2,3-dichloroquinoxaline 6-carbonyl | Bluish green. |
| Same as above | 2,3-dichloroquinoxaline-6-sulphonyl | Do. |
| —⟨⟩—SO₃H with OCH₃ | 2,3-dichloroquinoxaline-6-carbonyl | Green. |
| Same as above | 2,3-dichloroquinoxaline-6-sulphonyl | Do. |
| —⟨⟩ with H₃C, CH₃, SO₃H | 2,3-dichloroquinoxaline-6-carbonyl | Bluish green. |
| Same as above | 2,3-dichloroquinoxaline-6-sulphonyl | Do. |
| —⟨⟩—C(CH₃)₃ with SO₃H | 2,3-dichloroquinoxaline-6-carbonyl | Green. |
| Same as above | 2,3-dichloroquinoxaline-6-sulphonyl | Do. |
| —⟨⟩ with CH₃, SCH₃, CH₃ (Mixture of m and p-sulphonic acid.) | 2,3-dichloroquinoxaline-6-carbonyl | Blue. |
| Same as above | 2,3-dichloroquinoxaline 6-sulphonyl | Do. |

EXAMPLE 5

A solution of 9.2 parts of the sodium salt of 1,4-di-(4'-methylphenylamino) - 5 - amino-anthraquinone-2',2"- solution so that a pH value of 4 to 5 is maintained in the reaction mixture. After the dropwise addition of the anthraquinone component, the mixture is stirred at pH 4 to 5 for a further 30 minutes and then filtered off with suction from undissolved matter. The clarified dyestuff solution is buffered by the addition of a solution of 3.44 parts of primary sodium phosphate (NaH₂PO₄·2H₂O) and 1.5 parts of secondary sodium phosphate (Na₂HPO₄) in 25 parts of water. The dyestuff of the formula

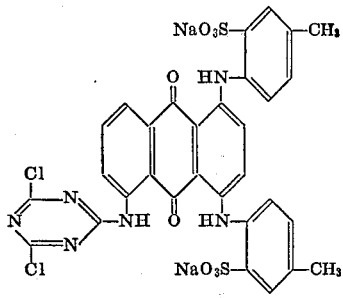

is subsequently salted out by the addition of 45 parts sodium chloride, filtered off with suction and washed with 200 parts of a 10% sodium chloride solution.

The dyestuff is pasted with a solution of 0.344 parts of primary sodium phosphate and 0.15 parts of secondary sodium phosphate in 5 parts of water, and the preparation is dried in a vacuum at 20°.

20 parts of a cotton fabric are introduced at 20 to 25° into a dyebath containing 0.6 parts of the dyestuff of the present example dissolved in 400 parts of water. 12 parts sodium sulphate are added after 10 minutes, 2 parts sodium carbonate previously dissolved in water are added after a further 20 minutes and dyeing is then continued at 20 to 25° for one hour. After dyeing, the material is rinsed, soaped at the boil for 20 minutes with a sodium alkylsulphonate solution, rinsed again and dried. A green dyeing of good fastness properties is obtained.

EXAMPLE 6

19.3 parts 4-nitrobenzoyl chloride are added at 30–35° to a solution of 55 parts of the sodium salt of 1,4-di(4′-methylphenylamino) - 5 - amino - anthraquinone-2′,2″-disulphonic acid. The acid liberated by the reaction is neutralised by the addition of a 1N sodium hydroxide solution so that a pH value of 5.5 to 6.0 prevails in the reaction mixture. When the reaction is completed after about 2 hours, the mixture is filtered off with suction from undissolved matter and the filtrate is mixed with 148 parts sodium chloride. The resultant precipitate is filtered off with suction and washed with 1250 parts of a 10% sodium chloride solution.

The moist filter cake so obtained is dissolved in 850 parts of water. To the solution heated to 70–75° there is added dropwise within 30 minutes a solution of 17.2 parts sodium sulphide (Na₂S·3H₂O) and 11 parts sodium bicarbonate in 180 parts of water. A temperature of 75° is maintained until the reduction of the nitro group is completed. The hot mixture is filtered and the filtrate mixed at 20° with 165 parts sodium chloride. By suction-filtration of the resultant precipitate, washing of the filter cake with 1400 parts of a 13% sodium chloride solution and drying at 100°, there is obtained an intermediate product of the formula

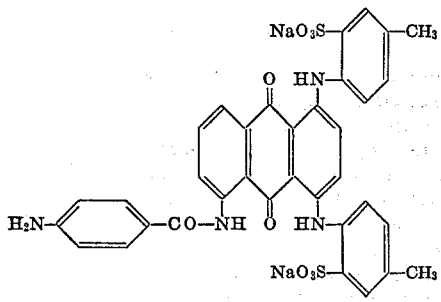

8.2 parts of this compound are dissolved at 55° in 150 parts of water. 4.1 parts 2,3-dichloroquinoxaline-6-sulphonic acid chloride and 0.3 parts chlorobenzene are added and a pH value of 6.0 to 7.0 is maintained in the reaction mixture by the dropwise addition of a 1N sodium hydroxide solution. When no more starting material is present, the chlorobenzene is driven off from the solution by means of a vigorous air current. After filtering off from small amounts of undissolved matter, the dyestuff is precipitated from the filtrate by the addition of 14 parts sodium chloride, filtered off with suction, washed with 100 parts of a 7.5% sodium chloride solution and dried in a vacuum at 20°. The dyestuff obtained corresponds to the formula

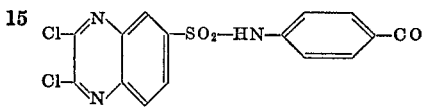

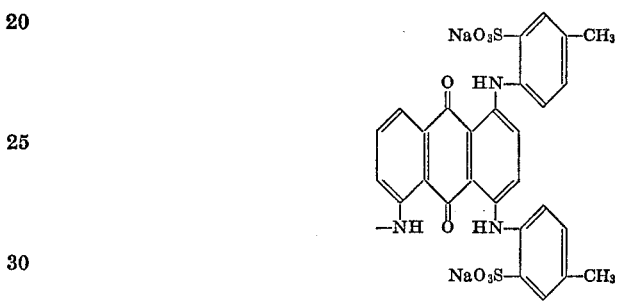

When 10 parts of cotton yarn are dyed according to the instructions of Example 3 with a dyebath containing 0.3 parts of the above reactive dyestuff per 200 parts of water, then a green dyeing of good fastness properties is obtained.

EXAMPLE 7

When in Example 6 the 2,3-dichloroquinoxaline-6-sulphonic acid chloride is replaced with 3.7 parts 2,3-dichloroquinoxaline-6-carboxylic acid chloride, the pH value of the reaction mixture is kept at 5.5 to 6.5 and otherwise an analogous procedure is followed, then there is obtained the dyestuff of the formula

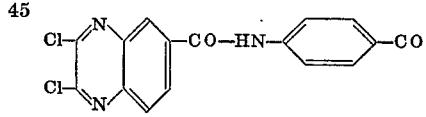

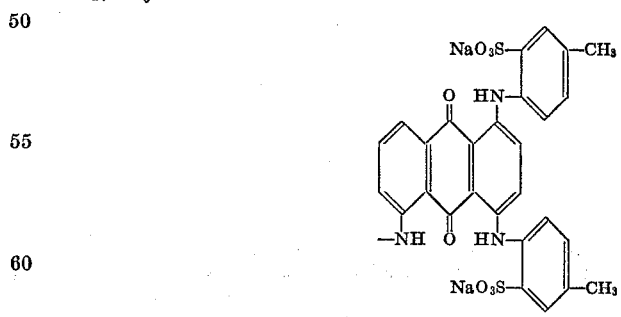

3 parts of this dyestuff are pasted with 2 parts of water at 20 to 25° and dissolved with 68 parts of water at 20°. 30 parts of a 10% sodium carbonate solution are added to this solution. 20 parts of a cotton fabric are padded on a foulard with the solution so obtained in such a manner that the liquor absorption of the fabric amounts to 80% of its dry weight. The padded fabric is dried at 60–70° and then steamed at 102° for 5 minutes; the dyeing is finished by rinsing, soaping and drying according to Example 4. The green dyeing so obtained is somewhat more yellowish than that described in Example 4. As described in the said example, fixation can be carried out also in the present case by storing the rolled-up fabric at

EXAMPLE 8

70.5 parts of the sodium salt of 1,4-di-(4'-methylphenyl-amino)-5-amino-anthraquinone-2',2''-disulphonic acid are dissolved in 1600 parts of water at 30 to 35°. 31 parts 3-nitrobenzene-sulphochloride are added to the solution and a pH value of 5.5 to 6.0 is maintained in the reaction mixture by the dropwise addition of a 1N sodium hydroxide solution. When the starting material has completely disappeared, the solution is cooled to 20° and filtered off from a small amount of undissolved matter. The reaction product is salted out from the filtrate by the addition of 35 parts sodium chloride, filtered off with suction and washed with 1000 parts of a 7% sodium chloride solution. The product so obtained is dissolved in 1100 parts of water and reduced according to the instructions of Example 6 with a solution of 17.6 parts sodium sulphide ($Na_2S \cdot 3H_2O$) and 11.2 parts sodium bicarbonate in 140 parts of water.

8.1 parts of the intermediate product so obtained are dissolved in 150 parts of water. To the solution heated to 50° there are added 2.6 parts 2,3-dichloroquinoxaline-6-carboxylic acid chloride and 0.3 parts chlorobenzene. A pH value of 5.5 to 6.5 is maintained in the reaction mixture by the dropwise addition of a 1N sodium hydroxide solution. When the reaction is completed, the chlorobenzene is driven off by introducing air, and the dyestuff solution is clarified by filtration. The dyestuff is salted out from the filtrate at 45° by the addition of 11 parts sodium chloride and filtered off with suction. After washing with 100 parts of a 5% sodium chloride solution, the resultant dyestuff is dried in a vacuum at 20°; it corresponds to the formula

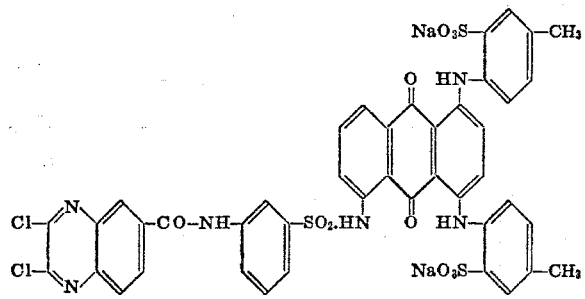

When a dyeing is produced on cotton with this dyestuff by the cold batch padding process according to Example 7, then a bluish green dyeing is obtained.

EXAMPLE 9

When the 2,3-dichloroquinoxaline-6-carboxylic acid chloride is replaced in Example 8 with 2,3-dichloroquinoxaline 6-sulphonic acid chloride and a pH value of 6.0 to 7.0 is maintained during the reaction, the otherwise analogous procedure yields a dyestuff which dyes cotton yarn bluish green.

EXAMPLE 10

22.7 parts of the sodium salt of 1,4-di-(4'-methylphenylamino)-5-(4'-aminobenzoylamino)-anthraquinone-2',2''-disulphonic acid, prepared according to Example 6, are dissolved in 400 parts of water at 55°. After adjusting the solution to a pH value of 5.5 to 6.0, 11 parts 2-methylsulphonyl-4,5-dichloro-6-methyl-pyrimidine are added and the above pH value is maintained by the dropwise addition of a 1N sodium carbonate solution. When the starting material can no longer be detected in the solution, the dyestuff solution is filtered. The dyestuff is salted out from the filtrate by the addition of 35 parts sodium chloride, filtered off with suction, the filter cake is washed with 250 parts of 6% sodium chloride solution and dried in a vacuum at 20°. The dyestuff obtained corresponds to the formula

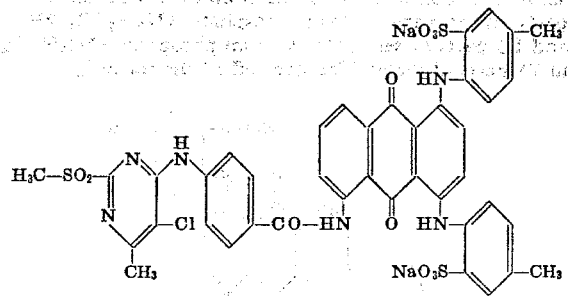

A fabric of cotton or staple fibre is printed with a printing paste consisting of

| | Parts |
|---|---|
| Dyestuff of the present example | 40 |
| Water at 60° | 230 |
| Urea | 200 |
| Sodium m-nitrobenzene-sulphonate | 10 |
| Sodium bicarbonate | 20 |
| Alginate thickener | 500 | the printed material is dried at 70° and fixation is subsequently carried out by steaming at 101 to 103° for 1 to 2 minutes. The fabric is subsequently rinsed cold, soaped at the boil, rinsed again and dried. A green print of very good fastness properties especially of fastness to light and wet processing, is obtained.

EXAMPLE 11

When the anthraquinone component is replaced in Example 10 with 23.4 parts of the sodium salt of 1,4-di-(4'-methylphenylamino)-5-(3'-aminophenyl)-sulphonamido-anthraquinone-2',2'''-disulphonic acid and an analogous procedure is otherwise followed, then there is obtained the dyestuff of the formula

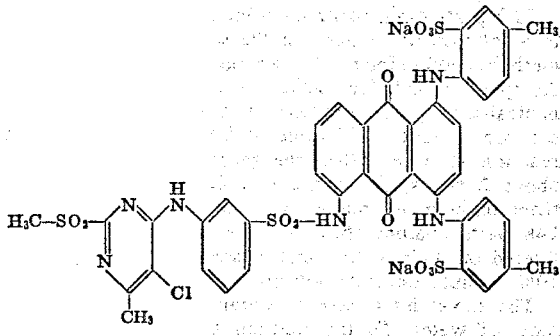

which yields a bluish green print on cotton or staple fiber according to the method of Example 10.

EXAMPLE 12

When the 2,3-dichloroquinoxaline-6-carboxylic acid chloride is replaced in Example 3 with 6.2 parts 1,4-dichlorophthalazine-6-carboxylic acid chloride and the process is otherwise carried out according to the instructions there given, then a reactive dyestuff is obtained which yields clear green dyeings on cotton by the pad-steaming method of Example 7.

EXAMPLE 13

14.2 parts of the sodium salt of 1,4-di-(β-sulphophenylethylamino)-5-amino-anthraquinone are dissolved at 45° in 600 parts of water. After the addition of 6.2 parts 2,3-dichloroquinoxaline-6-sulphonic acid chloride and 0.5 parts chlorobenzene, a pH value of 5.5 to 6.0 is maintained in the reaction mixture by the dropwise addition of a 0.5N sodium hydroxide solution. When the anthraquinone component is completely converted, the chlorobenzene is driven off from the solution by the introduction of air and the solution is clarified by filtration from small amounts of undissolved matter. The dyestuff is salted out from the filtrate at 20° by the addition of 52 parts potassium chloride, filtered off with suction and washed with 190 parts of a 5% potassium chloride solution. After drying the filter cake at 20° in a vacuum, a dyestuff of the formula

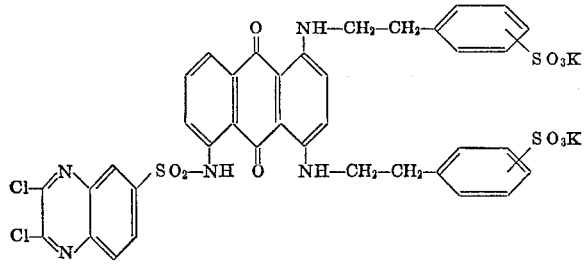

is obtained. The dyestuff yields clear blue dyeings on cotton yarn when dyed from a long bath.

EXAMPLE 14

13.2 parts of the sodium salt of 1,4-di-(β-sulphatoethylamino)-5-amino-anthraquinone are dissolved at 50° in 600 parts of water. After the addition of 7.4 parts 2,3-dichloroquinoxaline - 6 - sulphonic acid chloride, 0.5 parts chlorobenzene and 50 parts acetone, a 0.5N sodium hydroxide solution is added dropwise to the reaction mixture so that a pH value of 5 to 6 is maintained. When the reaction is completed, the chlorobenzene is driven off from the mixture by means of a vigorous air current. The dyestuff solution is subsequently clarified from small amounts of residues. The dyestuff solution is poured into 15 parts of a 10% sodium chloride solution, the resultant precipitate is filtered off with suction and washed with 400 parts of a 5% sodium chloride solution. After drying the filter cake, there is obtained a dyestuff of the formula

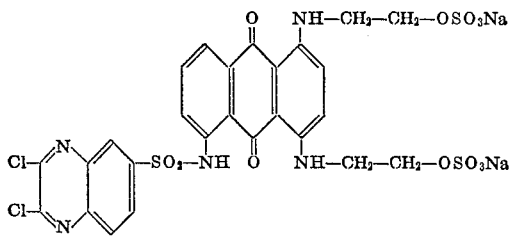

which yields clear blue dyeings from a long bath or by the pad-steaming method.

EXAMPLE 15

When the 2,3-dichloroquinoxaline - 6 - sulphonic acid chloride is replaced in Example 14 with 6.4 parts of the corresponding 6-carboxylic acid chloride and the process is otherwise carried out in an analogous manner, then a dyestuff is obtained, which dyes cotton yarn from a long bath in a more greenish blue shade than that of Example 14.

EXAMPLE 16

11.7 parts α-[N-methyl-N-(2,3 - dichloroquinoxaline-6-sulphony)]-aminoacetyl chloride and 0.3 parts chlorobenzene are added at 45° to a solution of 11 parts of the sodium salt of 1,4-di-(4' - methylphenylamino)-5-amino-anthraquinone-2',2''-disulphonic acid in 350 parts of water. A pH value of 5.5 to 6.0 is maintained in the reaction mixture by the dropwise addition of a 1N sodium carbonate solution. When the reaction is completed, the chlorobenzene is driven off by the introducing a vigorous air current, the mixture is diluted with 300 parts of water and filtered off at 45 to 50° from the insoluble residues. The filtrate is slowly mixed at 45° with 35 parts potassium chloride, the prescipitated dyestuff is subsequently filtered off with suction and washed with a 5% potassium chloride solution. The dyestuff which in the form of the free acid corresponds to the formula

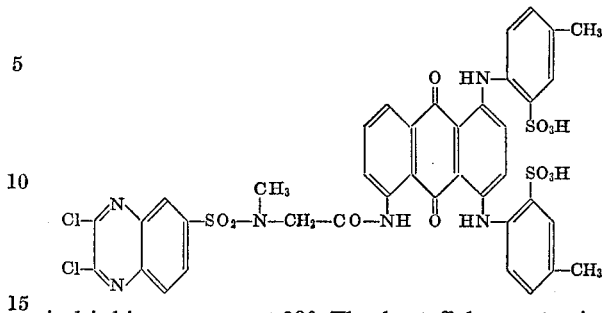

is dried in a vacuum at 20°. The dyestuff dyes cotton in a green shade.

EXAMPLE 17

17 parts of the sodium salt of 1,4-di-(4'-methylphenylamino) - 5 - amino-anthraquinone - 2',2'' - disulphonic acid are dissolved in 400 parts of water. 8.6 parts chloroacetyl chloride are added dropwise to this solution within 30 minutes and a pH value of 5.0 to 6.0 is maintained in the reaction mixture by the dropwise addition of a 1N sodium bicarbonate solution. After the dropwise addition of the chloroacetyl chloride, stirring of the mixture is continued for 30 minutes. The dyestuff is subsequently salted out by the gradual addition of 65 parts sodium chloride, filtered off with suction and washed with 200 parts of a 15% sodium chloride solution. The dyestuff is dried at 50° in a vacuum. It corresponds to the formula

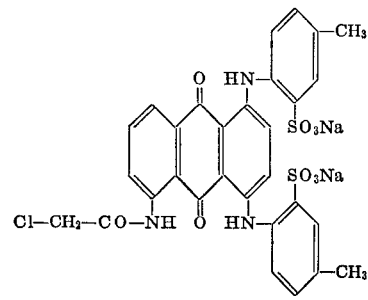

and dyes synthetic superpolyamide fibres in a green shade.

Similar dyestuffs are obtained, when the chloroacetyl chloride is replaced with equivalent amounts of β-chloropropionic acid chloride or 2-chloroethane-sulphochloride.

EXAMPLE 18

9.7 parts of 1,4-di-(4'-methylphenylamino) - 5 - amino-anthraquinone - 2',2'' - disulphonic acid are dissolved at 40° in 280 parts of water with simultaneous neutralisation. After 6.7 parts of 2-methylsulphonyl - benzthiazole-6-sulphochloride have been added to the solution a pH value of 5.5 to 6.0 is maintained in the reaction mixture by the dropwise addition of 1N sodium hydroxide solution. When the reaction is completed the dyestuff solution is filtered off and salted out at 20° with 35 parts of sodium chloride. The precipitated dyestuff is filtered off with suction, washed with 200 parts of a 10 percent sodium chloride solution and dried in a vacuum at 40°. The dyestuff obtained corresponds to the formula

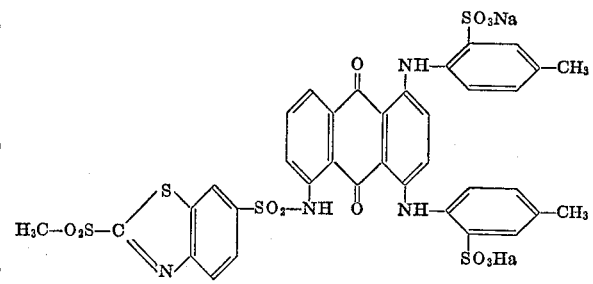

and dyes cotton green shades for instance by the pad-steaming method of Example 7.

Dyestuffs which can be dyed on cotton in the same manner are obtained if instead of 2-methylsulphonyl-benzthiazole-sulphochloride the reactive components Ac-Cl of the following table are reacted with the sodium salt of 1,4-di-(4' - methylphenylamino) - 5 - amino-anthraquinone-disulphonic acid.

2-methylsulphonyl-benzthiazole-6-carboxylic acid chloride
2-chlorobenzthiazole-6-carboxylic acid chloride
2-chlorobenzthiazole-6-sulphonic acid chloride
2,3-dichlorophthalazine-6-sulphonic acid chloride
2,2,3,3-tetrafluorocyclobutyl-1-carboxylic acid chloride
β-(2',2',3',3'-tetrafluorocyclobutyl-1')-acrylic acid chloride
β-(4',5'-dichloropyridazone-6'-yl-1')-ethyl-carboxylic acid chloride
4-(4',5'-dichloropyridazone-6'-yl-1')-phenylsulphonic acid chloride.

EXAMPLE 19

16 parts of the sodium salt of 1,4-di-(4' - methylphenyl-amino) - 5 - amino-anthraquinone - 2',2" - disulphonic acid are dissolved in 450 parts of water. To this solution there are added dropwise within 30 minutes at 5 to 10° 14 parts of α,β-dibromopropionic acid chloride. In the reaction mixture a pH value of 5.0 to 6.0 is maintained by the addition of 1N sodium bicarbonate solution. After the dropwise addition of the acid chloride it is further stirred until the reaction is complete. The dyestuff is salted out at 20° by the addition of 70 parts of sodium chloride, it is filtered off with suction and dried in a vacuum. The dyestuff has the formula

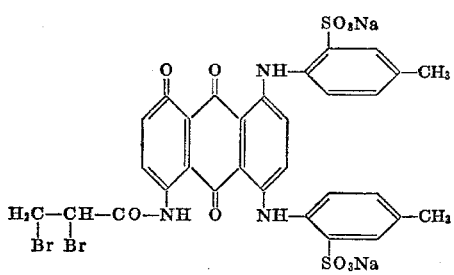

A 1 percent dyeing on wool can be prepared as follows: 10 parts of wool hank are predyed at 50° for 10 minutes in a dyebath which contains 0.1 part of the dyestuff of this example, 3 parts of 80 percent acetic acid, 5 parts of anhydrous sodium sulphate and 1 part of a levelling agent. Within 30 minutes the bath is heated to the boil and further boiled for 60 minutes. A clear green dyeing is obtained.

A similar dyestuff can be obtained if instead of α,β-dibromopropionic acid chloride 10 parts of α-bromo-acrylic acid chloride are used.

EXAMPLE 20

15.1 parts of 1,4-ditoluidino-5-(p-aminobenzoylamino)-anthraquinone-2',2"-disulphonic acid are dissolved in 500 parts of a 10 percent dioxane/water mixture and acylated with 7 parts of 5-chloro-2,4,6-trifluoropyrimidine at pH 6 to 7 and a temperature of 30 to 50°. It is salted out with 25 parts of sodium chloride and the residue is washed with a 5 percent sodium chloride solution. The dyestuff obtained corresponds to the following constitution

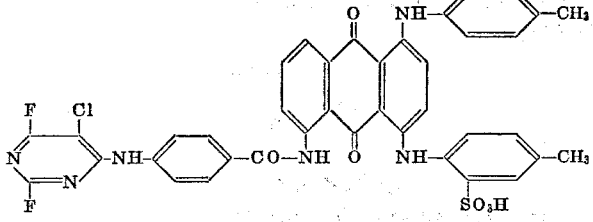

It dyes cotton from long bath fast green shades. It also dyes wool fast to wet processing.

What is claimed is:
1. A dyestuff of the formula

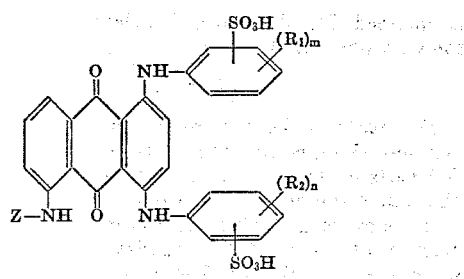

wherein
$R_1$ stands for hydrogen, Cl, Br, lower alkyl or lower alkoxy radicals;
$m$ stands for the number 0 or 1;
$R_2$ stands for hydrogen, Cl, Br, lower alkyl or lower alkoxy radicals;
$n$ stands for the number 1 or 2; and
$z$ stands for a triazine or pyrimidine, the ring member Z containing at least one reactive substituent selected from the group consisting of Cl, Br, F, and lower alkyl sulfonyl attached to a carbon atom of the heterocyclic ring; Z being linked to the NH group directly or via an amino phenyl carbonyl or an amino phenyl sulfonyl group; and wherein in all the above definition lower means containing from 1 to 4 carbon atoms.

2. The dyestuff of claim 1 of the formula

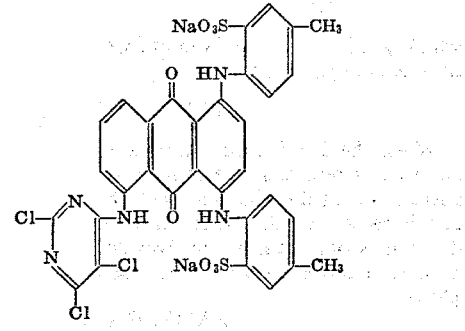

3. The dyestuff of claim 1 of the formula

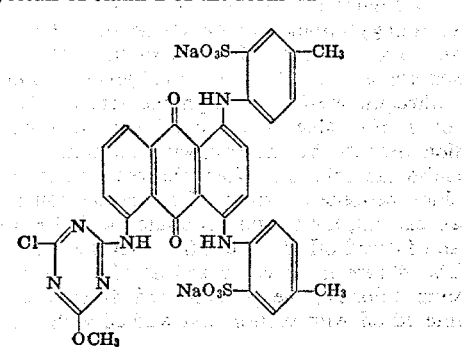

4. The dyestuff of claim 1 of the formula
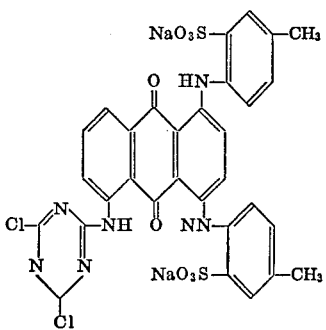
5. The dyestuff of claim 1 of the formula
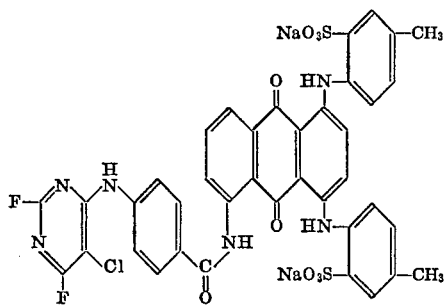
6. The dyestuff of claim 1 of the formula
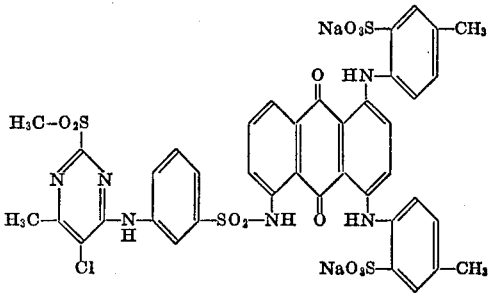
No references cited.
RICHARD J. GALLAGHER, Primary Examiner
U.S. Cl. X.R.
8—36, 63; 260—239.65, 256.5 R, 262, 303, 372, 373, 374, 378